S. W. CLEMENS.
Saw-Grinding Machine.
No. 129,003.
Patented July 16, 1872.
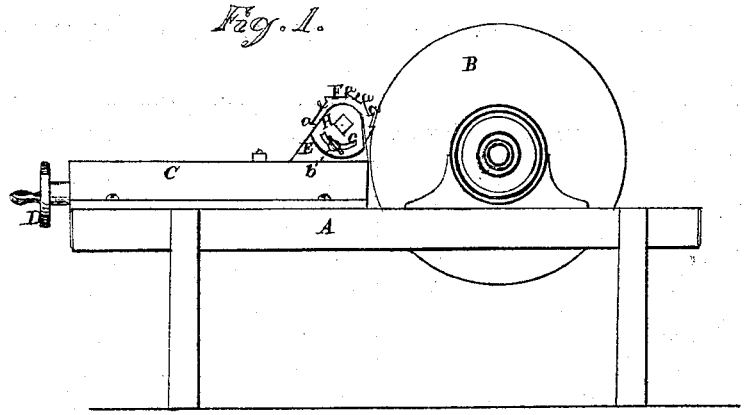
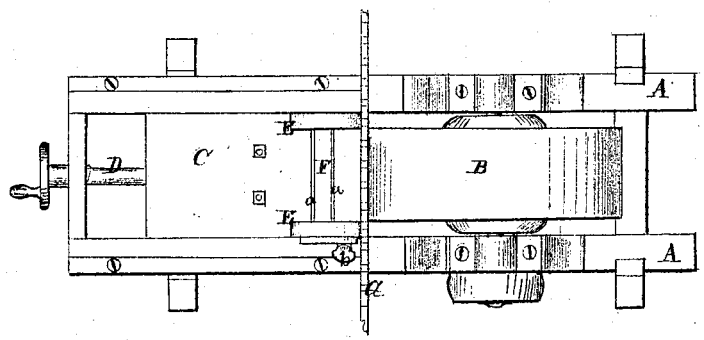
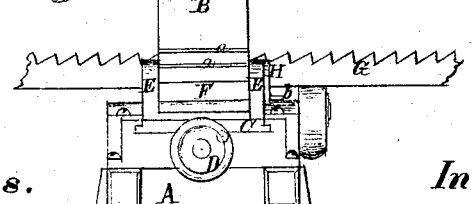
Witnesses.
W. A. Burridge
D. L. Humphrey
Inventor.
Sanford W. Clemens
R. Burridge & Co
Attys.
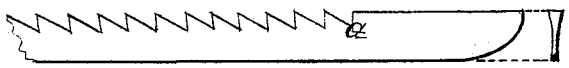

UNITED STATES PATENT OFFICE.

SANFORD W. CLEMENS, OF CLEVELAND, OHIO.

IMPROVEMENT IN SAW-GRINDING MACHINES.

Specification forming part of Letters Patent No. 129,003, dated July 16, 1872.

*To all whom it may concern:*

Be it known that I, SANFORD W. CLEMENS, of Cleveland, in the county of Cuyahoga and State of Ohio, have invented a certain new and Improved Web-Saw Grinding-Machine; and I do hereby declare that the following is a full, clear, and complete description of the same, reference being had to the accompanying drawing making part of this specification, in which—

Figure 1 is a side view of the machine. Fig. 2 is a plan view. Fig. 3 is an end view. Fig. 4 is a section of a saw.

Like letters of reference refer to like parts in the several views.

This invention relates to the grinding of web-saws; the object thereof being to hold and press the saw to the stone while it is being ground, so that it shall have a uniformity in thickness and an equal curve on each side, as hereinafter more fully described.

In the drawing, Fig. 1, A represents a frame, in which the grindstone B is mounted, and run in the usual way. On one side or front of the stone is arranged a sliding table, C, operated by the screw D, and whereby said table can be moved near to or away from the stone, for a purpose presently shown. On the end of the table nearest the stone is secured a pair of standards, E, Fig. 3, in which is journaled a roller, F. It will be observed that the face of said roller is formed with a series of plane surfaces, $e$, of various widths, as shown in Fig. 1, which presents an end view of the roller. These several planes are so formed as to have each a shoulder represented by the points $a$, slightly raised above the face of the planes, which planes may be more or less in number as circumstances may require.

The practical operation of this device is as follows: As above said, this machine is for holding web-saws while being ground, one of which is laid upon the roller lengthwise with the teeth upward, as represented at G in Figs. 2 and 3, with the back of the saw resting upon the shoulder of the plane on which it is laid. It will be seen that the axial line of the roller is about that of the stone, in consequence of which, when the saw is laid upon the plane its lower edge or back will touch the stone before the teeth or cutting-edge; hence the grinding will be the most along the line of the back, thereby making the back of the saw much thinner than the cutting-edge, as shown in Fig. 4. The grinding of one side of the saw being completed, which is done by moving it backward and forward across the face of the stone, and pressing it against the same by means of the hand-screw D, it is then removed and the opposite side ground in the same way, and to the same exact curve, as the special angle that the plane of the roller may have relatively to the face of the stone is retained by the screw $b$, Fig. 2, passing through the slot $c$, Fig. 1, in the arm H attached to the shaft of the roller, and whereby each plane thereon can be secured in any relative position to the stone that may be desired, according to the width of the saw.

It will be obvious that by this means the same exact amount of grinding can be given to each side of the saw, and of an equal curvature, so that the back thereof will range parallel with the sides of the cutting-edge and midway between them; hence the saw will cut with an equal pressure on each side, and therefore run true in the line of its work. The difference in the width of the planes is for the accommodation of saws of various widths, so that very narrow saws can be ground equally well as wide ones, and when ground neither of which require setting.

Claim.

What I claim as my invention, and desire to secure by Letters Patent, is—

The roller F having one or more planes and shoulders, $e$ and $a$, adjusting-arm H, and set-screw $b$, as constructed and arranged in relation to the stone B, and opperated in the manner set forth, for the purpose specified.

SANFORD W. CLEMENS.

Witnesses:
W. H. BURRIDGE,
D. L. HUMPHREY.